United States Patent
Barezzani (10) Patent No.: US 10,471,578 B2
(45) Date of Patent: Nov. 12, 2019

(54) HYDRODYNAMIC COMPRESSION OR CUTTING TOOL

(71) Applicant: Cembre S.p.A., Brescia (IT)

(72) Inventor: Gualtiero Barezzani, Brescia (IT)

(73) Assignee: Cembre S.p.A., Brescia (IT)

( * ) Notice: Subject to any disclaimer, the term of this patent is extended or adjusted under 35 U.S.C. 154(b) by 53 days.

(21) Appl. No.: 15/446,496

(22) Filed: Mar. 1, 2017

(65) Prior Publication Data

US 2017/0252912 A1    Sep. 7, 2017

(30) Foreign Application Priority Data

Mar. 2, 2016   (IT) .......................... 102016000022002
Mar. 18, 2016  (IT) .......................... 102016000028592

(51) Int. Cl.
   *B25B 27/14*    (2006.01)
   *F15B 11/08*    (2006.01)
   (Continued)

(52) U.S. Cl.
   CPC .............. *B25B 27/14* (2013.01); *B23D 15/14* (2013.01); *B23D 29/002* (2013.01); *B25B 27/10* (2013.01); *B25F 5/005* (2013.01); *F15B 11/08* (2013.01); *F15B 13/0401* (2013.01); *F15B 20/002* (2013.01); *H01R 43/0486* (2013.01); *H02K 7/145* (2013.01); *F15B 2211/20515* (2013.01); *F15B 2211/7051* (2013.01); *F15B 2211/862* (2013.01)

(58) Field of Classification Search
   CPC ....... B23D 15/14; B23D 29/002; B25F 5/005; F15B 2211/20515; H01R 43/0486
   See application file for complete search history.

(56) References Cited

U.S. PATENT DOCUMENTS 4,024,794 A  *  5/1977  Grubb .................... B26B 17/02
                                                    91/189 A
5,595,462 A  *  1/1997  Hensley ............... B23Q 1/0036
                                                    408/1 R
(Continued)

FOREIGN PATENT DOCUMENTS

CN        102606460 A      7/2012
CN        103386157 A     11/2013
(Continued)

*Primary Examiner* — Andrea L Wellington
*Assistant Examiner* — Fernando A Ayala
(74) *Attorney, Agent, or Firm* — Blank Rome LLP (57) ABSTRACT

A hydrodynamic compression tool comprises an electrical motor, which can be powered by a control circuit, a hydraulic pump which can be actuated by the motor so as to increase the pressure of a hydraulic liquid acting on an actuating piston, two jaws, which can be mutually moved by the actuating piston between an open position and a closed position for carrying out the compression or the cut, an actuating button, which acts on a switch of the control circuit to actuate the motor, a return device which returns the jaws to the open position by a return of the hydraulic fluid from the actuating piston towards the hydraulic pump through a return valve, and a mechanism for delaying the opening of the return valve via the return device, so as to allow verification of the position of the jaws before the return of the jaws to the open position.

18 Claims, 5 Drawing Sheets

(51) Int. Cl.
*B23D 29/00* (2006.01)
*F15B 13/04* (2006.01)
*F15B 20/00* (2006.01)
*H01R 43/048* (2006.01)
*H02K 7/14* (2006.01)
*B23D 15/14* (2006.01)
*B25F 5/00* (2006.01)
*B25B 27/10* (2006.01)

(56) References Cited

U.S. PATENT DOCUMENTS

| | | | |
|---|---|---|---|
| 7,062,998 B2 | 6/2006 | Hohmann et al. | |
| 2003/0079513 A1 | 5/2003 | Miyamoto et al. | |
| 2004/0237312 A1* | 12/2004 | Hernandez | B26B 5/001 |
| | | | 30/162 |
| 2010/0154599 A1 | 6/2010 | Gareis | |
| 2013/0276313 A1* | 10/2013 | Zhou | B26B 15/00 |
| | | | 30/228 |
| 2016/0363510 A1* | 12/2016 | Kanack | B25B 27/10 |

FOREIGN PATENT DOCUMENTS

| | | |
|---|---|---|
| CN | 204155713 U | 2/2015 |
| WO | WO 2016/005838 A1 | 1/2016 |

\* cited by examiner

HYDRODYNAMIC COMPRESSION OR CUTTING TOOL

BACKGROUND OF THE INVENTION

1. Field of the Invention

The present invention relates to a hydrodynamic compression or cutting tool.

2. Description of the Related Art

Hydrodynamic compression and/or cutting tools are often used to perform determined connection operations, e.g. compressing connectors on electrical wires or for hydraulic pipes, compressing rivets, or for cutting operations, e.g. cutting electrical wires during electrical system installation and maintenance.

Such tools usually comprise an electrical motor supplied by an accumulator and a hydraulic pipe which causes an increase of pressure of a hydraulic liquid acting on an actuating piston to move it against the bias of a pressure spring. In turn, the actuating piston is connected to a movable jaw so as to move it during the compression operation towards a fixed jaw of the tool. The jaws may be shaped and/or provided with interchangeable accessory elements so as to adapt to a particular object, e.g. an electrical contact to be compressed or a metallic bar to be cut.

The operating modes of the compression and cutting tools are determined by a condition of interruption of the pressurization of the hydraulic liquid to a the already closed jaws or at completion of the compression or of the cutting, and by a return mode of the hydraulic fluid towards a tank of the hydraulic pump, which allows the actuating piston to return towards a rest position thereof and thus the opening of the jaws.

Hydrodynamic compression tools with a so-called manual return are known, in which, after the end of the pressurization of the hydraulic liquid and the consequent completion of the working cycle, the return of the hydraulic liquid and the consequent return of the jaws towards their open position occurs by pressing a manual release button for all the time needed to reach the required opening width of the jaws. The manual release button acts by means of a manual release mechanism on the return valve so as to keep it open when the manual release button is pressed and to close it when the release button is not pressed.

The manual return ensures complete control of the jaw return to the operator but indeed requires the release button to be pressed for the entire jaw opening time.

Hydrodynamic compression tools with a so-called automatic return are also known, in which, after the end of the pressurization of the hydraulic liquid and the consequent completion of the working cycle, the return of the hydraulic liquid and the consequent return of the jaws towards their open position occurs by means of a maximum pressure valve which opens initially with the reaching of a maximum pressure of the hydraulic liquid and which is kept open by means of a stop mechanism of the shutter of the maximum pressure valve in the open condition or by means of the floating of the valve.

The known automatic return occurs without voluntary activation by the operator and deprives the operator from the possibility of verifying the final state reached after the completion of the compression or cutting or partial cutting cycle.

SUMMARY OF THE INVENTION

It is an object of the present invention to provide a hydrodynamic compression and/or cutting tool having features such to improve the control of the working cycle and of return of the jaws and to facilitate the use of the tool and the verification of the end of compression or end of cutting situation.

These and other objects are achieved by means of a hydrodynamic compression and/or cutting tool according to following description and claims. The dependent claims relate to advantageous embodiments.

According to an aspect of the invention, a hydrodynamic compression or cutting tool comprises:

an electrical motor, which can be powered by an accumulator or by mains supply, by means of a control circuit, a hydraulic pump, which can be actuated by means of the motor so as to increase the pressure of a hydraulic liquid acting on an actuating piston, two jaws, which can be mutually moved between an open position and a closed position by means of the actuating piston for performing the compression or the cut, an actuating button, which acts on a switch of the control circuit to actuate the motor, return means, which perform a return of the jaws towards the open position by means of a return of the hydraulic fluid from the actuating piston towards the hydraulic pump through a return valve, wherein, in an operating mode, after the completion of the compression or of the cut, the return means open the return valve and hold it open until the open position of the jaws is reached, delaying means adapted to delay the opening of the return valve by means of the return means, so as to allow an inspection of the position of the jaws reached before the return of the jaws towards the open position.

The tool thus configured avoids the need to apply a continuous manual pressure on the release button for the entire opening time of the jaws and, at the same time, allows the operator to verify the final state reached when the compression or cutting or partial cutting cycle is completed.

According to an aspect of the invention, the return means comprise a return device connected to the actuating button and to the return valve, so as to be able to trigger the opening of the return valve and hence the movement of the jaws towards the open position by means of the same actuating button which also controls the actuating of the motor.

In particular, it may be provided that:

a first movement of the actuating button in a first direction (e.g. pressing towards the inside of the housing) triggers the actuating of the electrical motor and the closing of the return valve, a second movement of the same actuating button in a second direction (e.g. releasing towards the outside of the housing) interrupts the actuation of the motor and the opens the return valve.

In this case, the delaying means are implemented by the actuating button.

According to a further aspect of the invention, the return means comprise a return device connected to the return valve and controlled by the control circuit, so as to open the return valve and hence start the movement of the jaws towards the open position, automatically at the expiry of a preset delay time, which is counted from the completion of the compression or the cutting, e.g. from when the motor is switched off.

In this case, the delaying means are implemented by the control circuit.

BRIEF DESCRIPTION OF THE DRAWINGS

In order to understand the invention and better appreciate its advantages, the description of some embodiments will be provided below by way of non-limiting examples with reference to the accompanying figures, in which:

FIGS. 11A to 23 show examples of screenshots of a multifunctional display of a controller of the tool according to embodiments.

DETAILED DESCRIPTION OF THE PREFERRED EMBODIMENTS

With reference to the figures, a hydrodynamic compression and/or cutting tool 1 comprises:
a housing 3,
an accumulator seat 4, adapted to receive the accumulator 5 and having electrical terminals which make an electrical contact with the accumulator 5,
an electrical motor 6, supported by the housing 3, which can be powered by the accumulator 5,
a hydrodynamic pump 7, supported by the housing 3 and connected to the motor 6 so as to increase the pressure of a hydraulic liquid in response to the movement of the motor 6,
an electronic control circuit 28 connected to the electrical motor 6 and to the accumulator 5 for controlling the electrical motor 6,
an actuating button 18 which acts on a switch of the control circuit 28 to actuate the motor 6,
a working head 11, which comprises an actuating piston 20 on which acts the hydraulic liquid, and two jaws 21, 22 connected in mutually mobile manner with respect to each other and movable by means of the actuating piston 20 between an open position and a closed position for compressing or cutting, and a return spring 23 which acts on the actuating piston 20 so as to bias it elastically into a resting position in which the jaws 21, 22 are in the open position.

The working head 11 may comprise a body 19 with an actuating cylinder 27 which receives an actuating piston 20 so that it can be moved by means of the pressure fluid.

Figure 1:
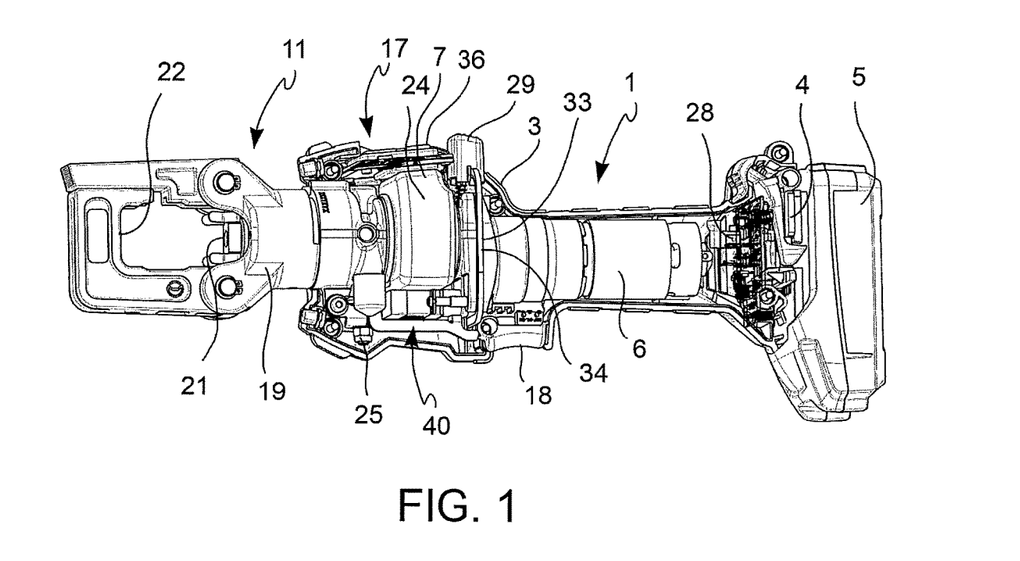
FIG. 1 is a side view of a compression/cutting tool according to an embodiment, in which one part of the housing has been removed.
Figure 2:
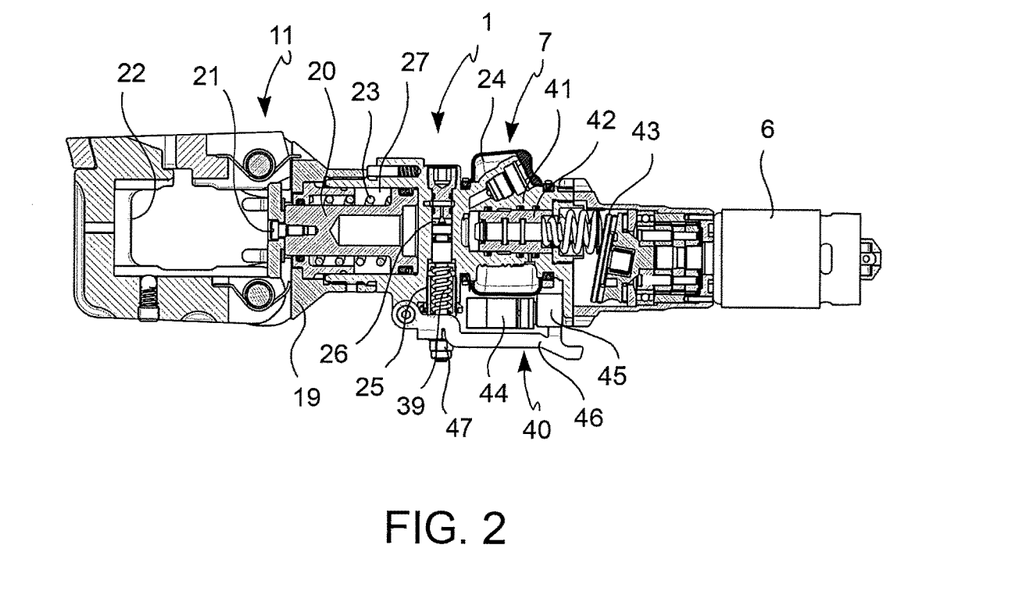
FIG. 2 is a longitudinal side section view of mechanical components of a compression/cutting tool according to an embodiment.

In the embodiment shown in FIGS. 1 and 2, the working head is directly connected to the housing 3.

The tool 1 further comprises return means 40 which perform a return of the jaws 21, 22 towards the open position by means of a return of the hydraulic liquid from the actuating piston 20 towards the hydraulic pump 7 by means of a return valve 25, in which in at least one operating mode, after completion of the compression or the cutting, the return means 40 open (e.g. automatically) the return valve 25 and hold it open (automatically, i.e. without requiring a continuous manual action to keep the return valve 25 open) until the jaws 21, 22 reach the open position.

According to an aspect of the invention, the tool 1 comprises delaying means adapted to delay the opening of the return valve 25 by means of the return means, so as to allow an inspection of the position of the jaws 21, 22 reached before the return of the jaws 21, 22 towards the open position. In other words, the delaying means are adapted to delay the function of the return means so as to keep the jaws 21, 22 stopped for a time needed or desired before their return towards the open position.

The thus configured tool 1 avoids the need to apply a continuous manual pressure on the release button for the entire reopening time of the jaws 21, 22 and at the same time allows the operator to verify the final state reached when the compression or cutting or partial cutting cycle is completed.

According to an aspect of the invention, the return means 40 and, thus the opening of the return valve 25 by means of the return means 40, are enabled (e.g. by means of a control circuit which will be described below) only under the condition that one or more working parameters (e.g. hydraulic liquid pressure acting on the actuation cylinder, limit temperature of the motor or of the hydraulic liquid, power drawn by the motor, position of the jaws, position of the actuating piston, pressurization time) detected by means of a sensor or a combination thereof or a value derived therefrom, reaches a corresponding predetermined or preselectable reference parameter (limit pressure, limit temperature, limit power drawn by the motor, jaws limit position, actuating piston limit position, pressurization limit time).

This makes it possible to stop the jaws of the tool during their advancement towards the closed position without causing an undesired reopening of the jaws instead of the voluntary stop. Furthermore, by virtue of the double condition for the return (enabling of the return means according to an end of working cycle criterion and releasing of the delaying means), the return by releasing the delaying means occurs only after having completed the compressing or cutting operation and thus indicates such completion to the operator.

Detailed Description of the Return Means and of the Delaying Means

According to an embodiment, the return means 40 comprise a return device 40 connected to the return valve 25 and (actuatable) with the actuating button 18, so as to be able to trigger the opening of the return valve 25 and hence the movement of the jaws 21, 22 towards the open position by means of the same actuating button 18 which also controls the actuating of the motor 6.

According to a preferred embodiment, a first movement and maintenance of the actuating button 18 in a first direction/position (e.g. a pressing of the actuating button 18 towards the inside of the housing 3 or in a generic motor actuation direction) triggers the closing of the return valve 25 and triggers and maintains the actuation of the motor 6, while a second movement of the same actuating button 18 in a second direction/position (e.g. a releasing of the actuating button 18 so that it repositions itself autonomously, e.g. elastically towards the outside of the housing 3 or in a generic motor switch-off direction) interrupts the actuation of the motor 6 and opens the return valve 25.

In this embodiment, the delaying means are made by the actuating button 18, which for as long as it remains pressed by the operator in the first direction prevents and delays the function of the return device 40.

Figure 3:
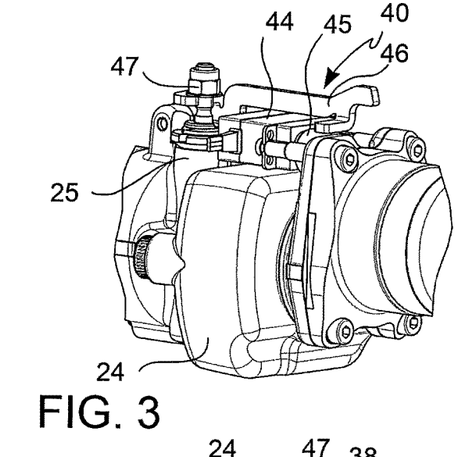
FIGS. 3 and 4 show a return device in a valve closing configuration and in a valve opening configuration according to a first embodiment.
Figure 4:
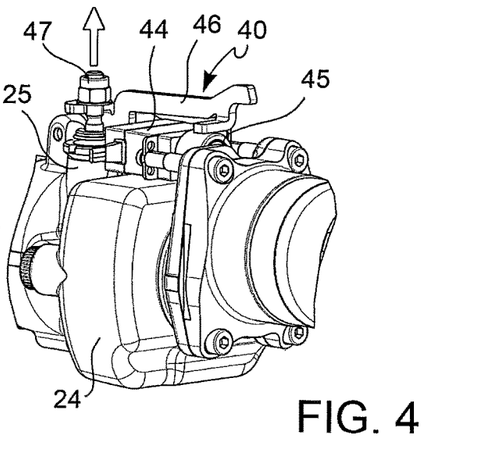

In an embodiment (FIGS. 3, 4), the return device 40 comprises an electrical servo motor 44, to the rotor of which a cam 45 is connected, the cam acting on a lever 46 which engages the head of a shutter 47 of the return valve 25. A power supply circuit of the servo motor 44 comprises a switch associated with the actuating button 18 and configured to control the servo motor 44 so that:

when the actuating button 18 is released (or at the second movement of the actuating button 18 in the second direction/position), the servo motor 44 orients the cam 45 to a position in which the lever 46 opens the return valve 25 and holds it open, when the actuating button 18 is actuated (or at the first movement of the actuating button 18 in the first direction/position), the servo motor 44 orients the cam 45 to a position in which the lever 46 allows the closing of the return valve 25 but preferably does not obstruct an opening thereof, in particular if the return valve 25 also performs the function of maximum pressure valve. The closing of the return valve 25 occurs by virtue of a spring 39 which permanently pushes the shutter 47 into the closed position.

Figure 5:
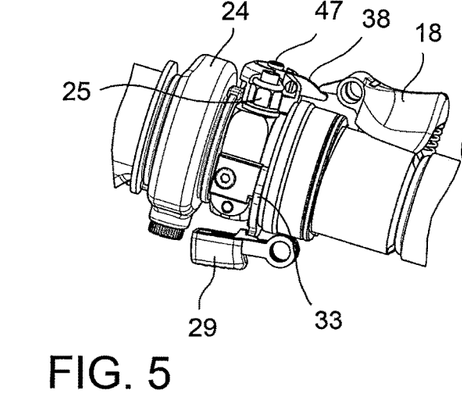
FIGS. 5 and 6 show a return device in a valve closing configuration and in a valve opening configuration according to a second embodiment.
Figure 6:
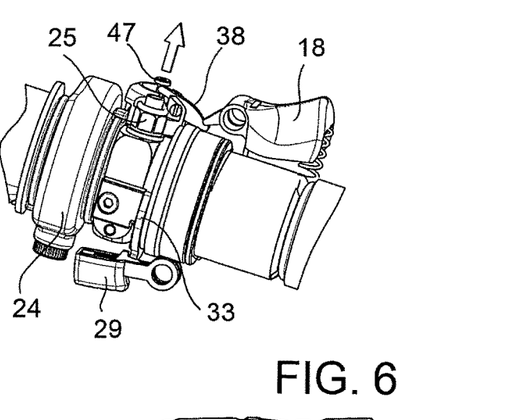

In a further embodiment (FIG. 5, 6), the return device 40 comprises a mechanical-only lever mechanism 38, associated with the actuating button 18 and with the head of a shutter 47 of the return valve 25 and configured so that:

when the actuating button 18 is released (or at the second movement of the actuating button 18 in the second direction/position), the lever mechanism 38 opens the return valve 25 and holds it open, when the actuating button 18 is actuated (or at the first movement of the actuating button 18 in/to the first direction/position), the lever mechanism 38 allows the closing of the return valve 25 but preferably does not obstruct an opening thereof, in particular if the return valve 25 also performs the function of maximum pressure valve. The closing of the return valve 25 occurs by virtue of a spring 39 which permanently pushes the shutter 47 into the closed position.

Figure 7:
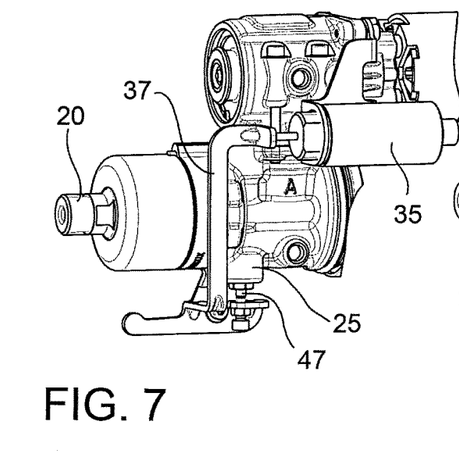
FIGS. 7 and 8 show a return device in a valve closing configuration and in a valve opening configuration according to a third embodiment.
Figure 8:
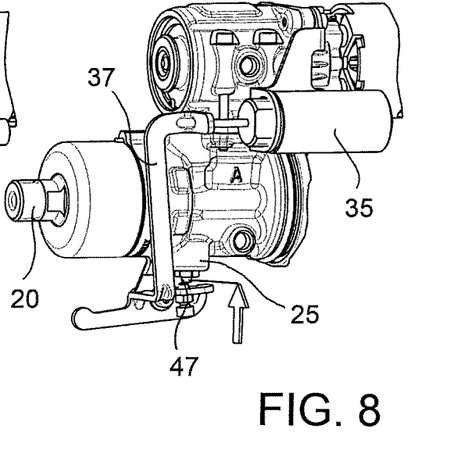

In a further embodiment (FIGS. 7, 8), the return device 40 comprises an electromagnetic actuator (solenoid) 35 to which a lever 37 is connected, which engages the head of a shutter 47 of the return valve 25. A power supply circuit of the electromagnetic actuator 35 comprises a switch associated with the actuating button 18 and configured to control the solenoid so that:

when the actuating button 18 is released (or at the second movement of the actuating button 18 in/to the second direction/position), the electromagnetic actuator 35 orients the lever 37 to a position in which the lever 37 opens the return valve 25 and holds it open, when the actuating button 18 is actuated (or at the first movement of the actuating button 18 in the first direction/position), the electromagnetic actuator 35 orients the lever 37 to a position which allows the closing of the return valve 25 but preferably does not obstruct an opening thereof, in particular if the return valve 25 also performs the function of maximum pressure valve. The closing of the return valve 25 occurs by virtue of a spring 39 which, permanently pushes the shutter 47 into the closed position.

According to a further alternative embodiment, the return means 40 may comprise a return device 40 connected to the return valve 25 and controlled by the control circuit 28, so as to open the return valve 25 and hence start the movement of the jaws 21, 22 towards the open position automatically (and thus without any manual action by the operator) at the expiry of a delay time preset or preselectable by the operator, which is counted from the completion of the compression or the cutting, e.g. from when the motor 6 is switched off. The delay time may be in the range from 0.5 seconds to 5 seconds, preferably from 1 second to 2 seconds.

The compression or cutting completion moment is usually the instant in which the relative movement of the jaws 21, 22 towards the closed position stops, e.g.:

as a consequence of an automatic switch-off of the motor 6 performed by the control circuit 28 as a function of one or more interruption criteria, and/or as a consequence of the momentary opening of a maximum pressure valve in communication with the hydraulic fluid acting on the actuating piston 20, in which the maximum pressure valve may be the same return valve 25 or an additional valve, and/or as a consequence of an end of stroke stop of the jaws 21, 22 in the closed position.

According to a further embodiment (FIG. 1), the tool 1 may further comprise a manual return button 29 connected to a manual return device 33 configured to open and keep open the return valve 25 only for the time during which the return button 29 remains pressed and allows the closing of the return valve 25 when the manual return button 29 is released. Also in this case, with the manual button 29 released, the manual return device 33 does not obstruct an opening of the return valve 25, in particular if the return valve 25 also performs the function of maximum pressure valve. The closing of the return valve 25 occurs by virtue of a spring 39 which permanently pushes the shutter 47 into the closed position.

In an embodiment (FIG. 1), the manual return device 33 may comprise a transmission bar 34 connected to the manual return button 29 and to a lever (e.g. the lever 46 or the lever 37) of the return device 40, or to the shutter 47 of the return valve 25.

Detailed Description of the Hydraulic Pump

According to an embodiment, the hydraulic pump 7 comprises a tank 24, a pumping cylinder-piston assembly and a maximum pressure valve which, in this example, is formed by the return valve 25.

The pumping cylinder-piston assembly may comprise a pumping cylinder 41 with an intake opening connected to the tank 24 by means of a non-return valve, which allows the flow of hydraulic oil from the tank 24 into the pumping cylinder 41, and a discharge opening in communication with the actuating cylinder 27 of the working head 11. A non-return valve is arranged in the discharge opening to allow the flow of hydraulic oil from the pumping cylinder 41 towards the actuating cylinder 27, but not in the other way. A pumping piston 42 is accommodated in the pumping cylinder 41 so as to translate together with an oscillating member 43 actuated by the motor 6.

In a return duct 26 which connects the actuating cylinder 27 to the tank 24, there is the return valve 25, which in the present embodiment also performs the function of maximum pressure valve which is also able to open when a maximum calibration pressure of the hydraulic liquid is reached, which is higher than the pressure needed to compete the compression and/or cutting cycle (preset or preselected reference pressure). In alternative embodiments, two distinct valves may be provided, one of which works as return valve and the other of which works as maximum pressure valve.

In this manner, the actuation of the motor 6 operates the hydraulic pump 7 and moves the jaws 21, 22 from the open position either towards or in the closed position until the motor 6 is switched off or until a predetermined maximum calibration pressure is reached in the actuation cylinder 27. When the maximum calibration pressure is reached, the maximum pressure valve (return valve 25) automatically (and only momentarily) opens the return duct 26 to discharge (at least part of) the pressurized liquid from the actuating cylinder 27 into the tank 24.

Detailed Description of the Operating Modes

The tool may comprise a display 17 for selecting and viewing an operating mode between a plurality of operating modes. Furthermore, a touch key or mechanical button 36 is arranged either near or on the display 17 for selecting the operating mode and for selecting the viewing mode of the display 17 (the latter, if provided).

The selectable operating modes may comprise a working or hydraulic liquid pressurization mode (often characterized by a criterion for interruption of the pressurization or of the actuation of the motor 6) and a return mode of the actuating piston 20 towards its resting (open jaws) or of the return of the hydraulic fluid.

In a first return mode (manual return), which can be selected and viewed by means of the display 17, after the termination of the hydraulic liquid pressurization and the consequent completion of the work cycle, the hydraulic liquid depressurization and the consequent return of the jaws 21, 22 either to or towards their open position occurs by pressing the manual return button 29 for the time needed to reach the desired opening width of the jaws 21, 22.

In a second return mode (voluntary semi-automatic return), which can be selected and viewed by means of the display 17, after the termination of the hydraulic liquid pressurization and the consequent completion of the working cycle, the depressurization or a further depressurization and hydraulic liquid return and the consequent return of the jaws 21, 22 either to or towards their open position are delayed until the manual pressure on the manual actuation button 18 is released, and only when the manual actuation button 18 is released does the return and further depressurization of the hydraulic liquid begin which continues automatically until the manual actuation button 18 is pressed again, and in absence of a timely actuation of the actuation button 18, until the resting position of the actuation piston 20, which corresponds to the open position of the jaws 21, 22, is reached.

In a third return mode (involuntary automatic return), which can be selected and viewed by means of the display 17, after the end of the hydraulic liquid pressurization and the consequent completion of the working cycle, the hydraulic liquid depressurization (e.g. by opening the return valve) caused by the pressure of the hydraulic liquid or actuated by the control circuit 28 and the consequent return of the jaws 21, 22 towards their open position occurs automatically and without voluntary activation by the operator. This operating mode, although envisaged as possible but not necessary option, however displays the disadvantage of depriving the operator from the possibility of verifying the final state reached when the compression cycle is completed.

In a first working mode, which can be combined with any one of the first, second or third return modes and either preset or selectable and viewed by means of the display 17, the control circuit 28 automatically stops the motor 6 and opens the maximum pressure valve 25 when the maximum calibration pressure is reached.

In a second working mode, which can be combined with any one of the first, second or third return modes and with the first working mode, and which can be possibly selected and viewed by means of the display 17, the control circuit 28 automatically stops the motor 6 in dependency of a comparison of at least one predetermined reference parameter (pressure limit, limit temperature, power drawn by the motor, jaw position, actuating piston position, limit pressurization time) with a respective working parameter which is detected (detected pressure, detected temperature, detected electrical quantity, detected position, detected pressurization time) by means of a sensor (pressure sensor, temperature sensor, electrical sensor, position or displacement sensor, timer).

This contributes to reducing the mechanical stress on the components of the tool 1, saving electrical energy and increasing the autonomy of the tool 1.

Advantageously, when the detected working parameter reaches the predetermined or preselected reference parameter, the control circuit 28 automatically switches off the motor 6 and automatically enables the return means 40 (or, in other words, does not prevent their actuation), wherein the actuation itself of the return means 40 (after their enabling), and thus the opening of the return valve 25 by means of such return means 40 is in all cases subjected to (i.e. dependent from) the release of the delay means (for example, made by the actuating button 18 connected with the control circuit 28).

In all cases, the electrical motor 6 is at least also stopped by the control circuit 28 when the actuation button 18 is released. The stopping of the electrical motor 6 determines the completion or interruption of the step of pressurizing of the hydraulic liquid, and thus of the working cycle.

In a third working mode, which may be combined with any one of the first, second or third return modes and which can be selected and viewed by means of the display 17, the control circuit 28 either drives or influences the motor 6 and/or the hydrodynamic pump 7, according to a pre-set work scheme for a compression operation.

In a fourth working mode, which can be combined with any one of the first, second or third return modes and which can be selected and viewed by means of the display 17, the control circuit 28 either drives or influences the motor 6 and/or the hydrodynamic pump 7, according to a pre-set work scheme for a cutting operation.

In a fifth working mode, which can be combined with any one of the first, second or third return modes and which can be selected and viewed by means of the display 17, the control circuit 28 either drives or influences the motor 6 and/or the hydrodynamic pump 7, according to a predetermined work scheme for a punching operation.

The third, fourth or fifth working modes may include the second working mode and mutually differ, e.g. in the choice of the working parameter and/or of the comparison reference value and/or in the viewing mode of the display 17.

The compression mode is used to deform a connector on a conductor by means of inserts applied on the working head, wherein the end of the working cycle is defined by the reaching of a preset maximum pressure and the consequent stopping of the motor.

The cutting mode is used to cut an electrical conductor by means of blades with mutual scissor-, guillotine- or rotation-movement, wherein the end of the cycle is defined by the completion of the cutting of the conductor that is detected automatically by the control circuit (e.g. by means of a pressure sensor, a sensor of the electrical quantities of the motor or a sensor of the relative position of the blades) or recognized by the operator.

The punching mode is used to shear strips or metal plates, by means of a punch and a die applied to the working head, wherein the end of the cycle is defined by the completion of the shearing that is detected automatically by the control circuit (e.g. by means of a pressure sensor, a sensor of the electrical quantities of the motor or a sensor of the relative position between punch and die) or recognized by the operator.

In each of the three working modes and as a function of the selected operating mode, the pressure release and the hydraulic liquid return, and thus the return of the jaws 21, 22 towards its open position, may be manual, semi-automatic voluntary or (if envisaged) automatic involuntary. Detailed description of the working parameters The working parameter or parameters mentioned above with reference to the second working mode may be indicative for:
a resistance or mechanical resistance variation against a further pumping or mutual approaching of the jaws 21, 22, or
the reaching of a determined relative position of the jaws 21, 22, or
an overload situation of a component of the tool 1.

According to embodiments, the working parameters may comprise one or more of the following:
the hydraulic liquid pressure,
an electrical quantity indicative of the power draw of the electrical motor 6,
the temperature of the electrical motor 6,
the distance of the jaws 21, 22,
the position of the actuating piston,
a pressurization time.

The tool 1 may comprise one or more of the following:
a pressure sensor 30 in fluid communication with the hydraulic liquid acting on the actuation piston 20 of the working head 11,
an electrical quantity sensor 31, in particular a current sensor,
a temperature sensor 32 of the motor 6,
an indicator or detector of the distance of the jaws 21, 22,
a position sensor 48 of the actuating piston 20,
a time sensor,
connected to the circuit control circuit 28 which monitors the working parameter or parameters and which can automatically interrupt the actuation of the electrical motor 6 in dependency of one or more of the working parameters and of the selected working mode.

Detailed Description of the Electronic Control Circuit

The electronic control circuit 28 is configured to process the signals coming from one or more of the sensors 30; 31; 32 and to control the electrical motor 6 and/or the return valve 25 or other valve of the hydraulic pump 7, in dependency of the actuation of the actuating button 18 and of the quantities detected by the sensors 30; 31; 32.

The control circuit 28 comprises a processing unit (CPU), a memory associated with the processing unit (CPU), a communication interface associated with the processing unit (CPU) and adapted to receive signals (pressure, current, temperature) from the sensor 30, 31, 32 and to transmit the control signals to the electrical motor 6. The control circuit 28 further comprises a program for electronic processor loaded in the memory and configured to perform the processing of the signals and the operations needed to implement the operation methods. The control circuit 28 is connected to the accumulator 5 when the accumulator 5 is coupled to the accumulator seat 4 and could also have its own battery, possibly adapted to be charged when the control circuit 28 is connected to the accumulator 5. The accumulator seat 4 is preferably formed in the housing 3.

Detailed Description of the Display

The display 17 comprises, for example a LCD or LED or OLED display.

The control circuit 28 controls the display 17 to view one or more of the following, in addition to the selected operating mode:
a value indicative of a maximum compression force reached during a working cycle,
a confirmation, e.g. "OK", of the compression or cutting process result as a function of at least one comparison of one or more working parameters detected during the working cycle with a corresponding preset or preselected reference value,
an error warning, e.g. "FAIL", of the compression process result as a function of at least one comparison of one or more working parameters detected during the working cycle with a corresponding preset or preselected reference value,
an overload warning of one of the components of the hydraulic pump or of the tool, e.g. thermal overload or electrical overload of the motor 6,
an instantaneous value of one of the working parameters by means of the sensors 30, 31, 32 (motor temperature, hydraulic oil pressure etc.).

When the tool 1 is off and the control circuit 28 is started for the first time, the display 17 shows the selected operation mode for a minimum preset time, e.g. 2 seconds.

Figure 19:
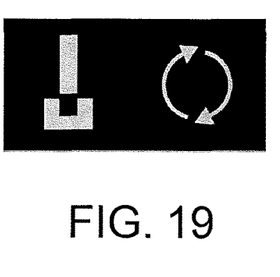

FIGS. 14 to 19 show examples of screenshots of six possible operating modes, of which one, more than one or all may be implemented in the tool 1:
compression with manual return (FIG. 14)
cutting with manual return (FIG. 15)
punching with manual return (FIG. 16)
compression with voluntary semi-automatic return (FIG. 17)
cutting with voluntary semi-automatic return (FIG. 18)
punching with voluntary semi-automatic return (FIG. 19).

FIGS. from 11A to 13B diagrammatically show examples of screenshots containing completion confirmation, the operative modes and the maximum pressure reached (where applicable) for a working cycle according to the six operating modes described above.

Figure 20A:
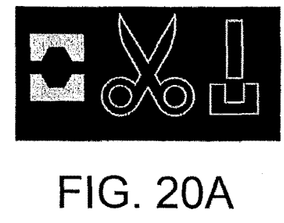
Figure 20B:
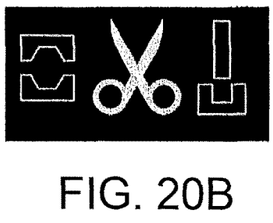
Figure 20C:
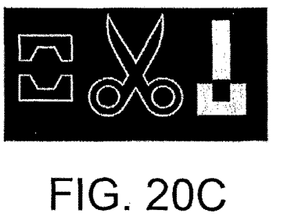

FIGS. 20A, 20B, 20C show examples of screenshots of a selection menu of the working mode of the operating mode. The working mode is selected by passing from one icon to the successive one by pressing button 36 associated with the display 17 and connected to the control circuit 28. The passage from one icon to another may be viewed by an alteration, e.g. the filling of the shape, of the currently selected icon. The non-selected icons are shown as contour only. Holding button 36 pressed for an intermediate time, e.g. 1 second, will open selection mode. Touching button 36 will move the selection from one icon to the next.

Holding button 36 pressed for a prolonged time, e.g. 2 seconds, will store the selection.

In an embodiment, the control circuit 28 with button 36 and display 17 allow selecting a pressure measuring unit from at least two measuring systems, e.g. Imperial and UNI measuring systems.

Figure 21:
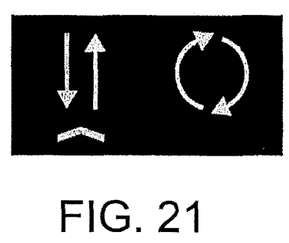

FIG. 21 shows an example of screenshot of a selection menu of the return mode of the operating mode.

The return mode can be selected by means of a cursor viewed near the icon which represents the currently selected return mode. Holding button 36 pressed for an intermediate time, e.g. one or two seconds, will open selection mode. Touching button 36 will switch the selection from one icon to the next. Holding button 36 pressed for a prolonged time, e.g. 2 seconds, will store the selection.

According to a further embodiment, when the temperature sensor 32 detects a temperature of the motor 6 higher than a maximum temperature, e.g. 90° C., the control circuit 28 completes the current working cycle and subsequently performs a safe shutdown of the motor 6 until the detected temperature drops under a threshold value, e.g. lower than 80° C.

During the safety shutdown, the display 17 shows a motor overheating warning message.

Figure 22:
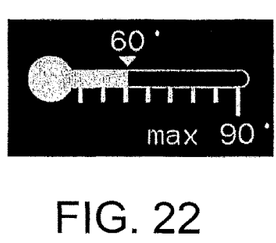

In an embodiment (FIG. 22), the display 17 shows the instantaneous (numeric) value of temperature of the motor 6, e.g. with a graphic view (thermometer symbol with scale) and/or the maximum permitted temperature, e.g. "max 90° C.".

Figure 23:
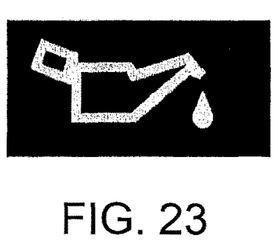

In an embodiment (FIG. 23), when during the actuation of the motor 6 (step of pumping), the pressure sensor 30 detects no increase of hydraulic liquid pressure for a predetermined time, e.g. 30 sec, the control circuit 28 generates an insufficient hydraulic liquid warning by means of the display 17. This allows the operator to immediately recognize and remove the cause of anomalous operation by filling the tank 24.

In an embodiment (FIG. 9), the cutting head 11 is removably connected to the housing 3 by means of a flexible pressure hose 8. The pressure hose 8 has a pump end 9 connected to the housing 3 and in communication with the hydraulic pump 7, and an opposite working end 10 connected to the working head 11 so as to communicate the hydraulic liquid pressure to the working head 11.

Figure 9:
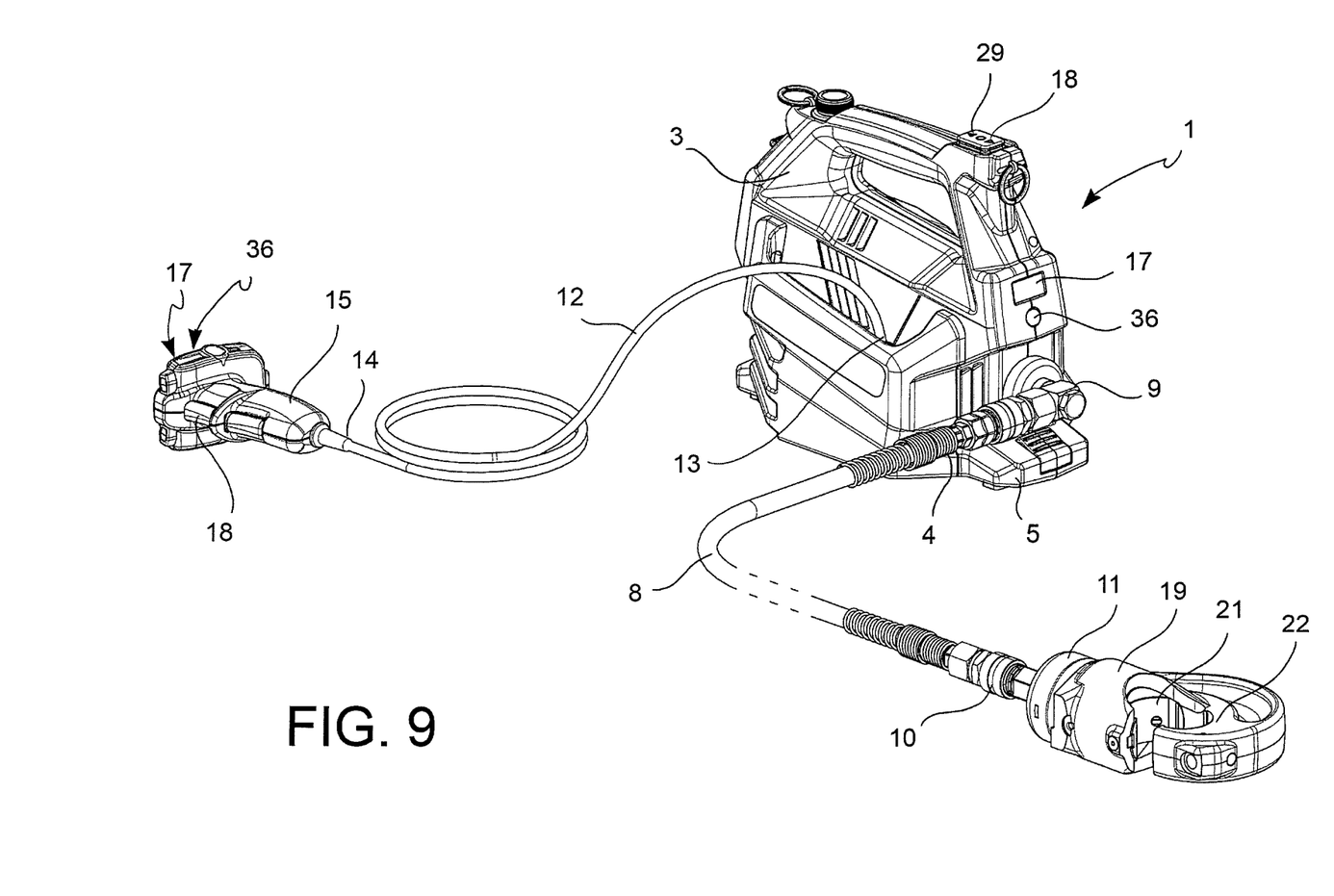
FIG. 9 is a perspective view of a compression/cutting tool according to a further embodiment.
Figure 10:
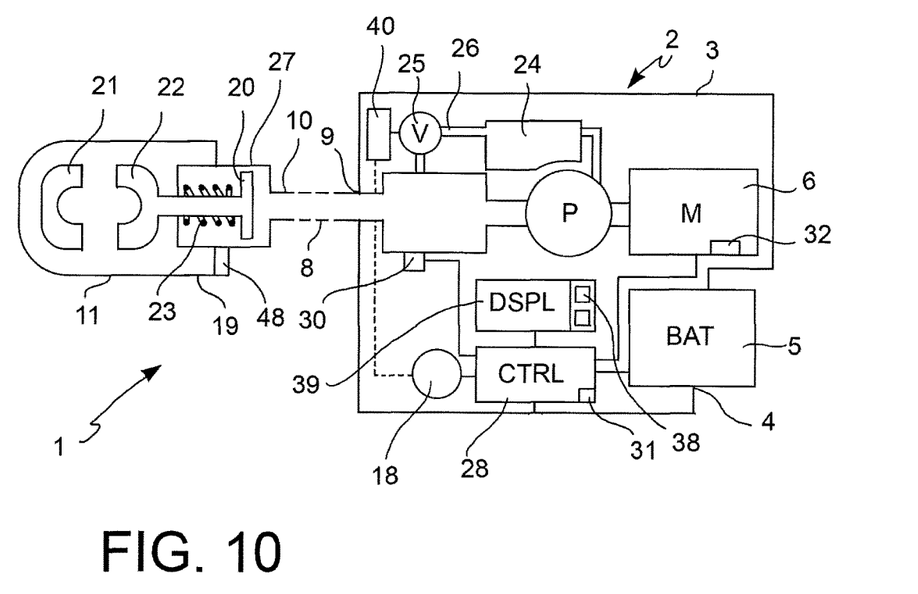
FIG. 10 shows a diagram of components and functional assemblies of a compression and/or cutting tool according to an embodiment.
Figure 11A:
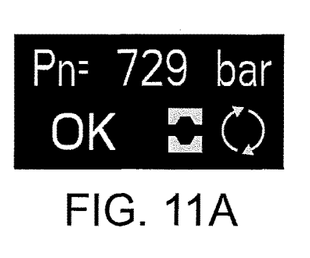
Figure 11B:
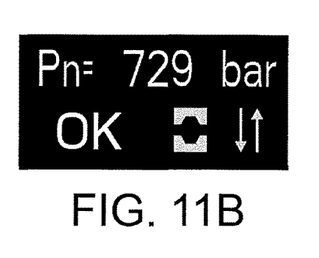
Figure 12A:
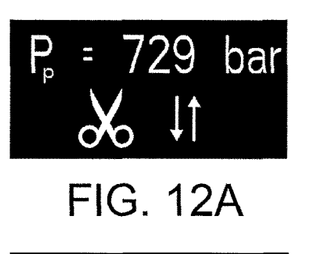
Figure 12B:
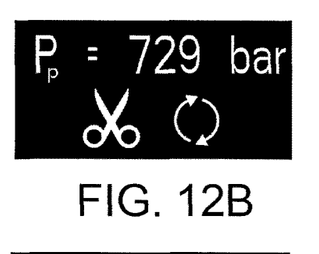
Figure 13A:
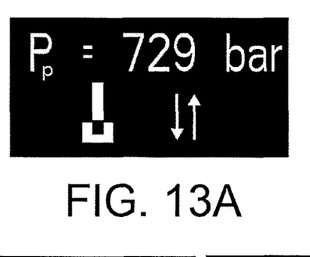
Figure 13B:
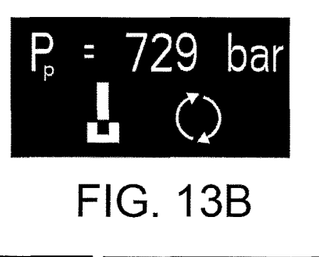
Figure 14:
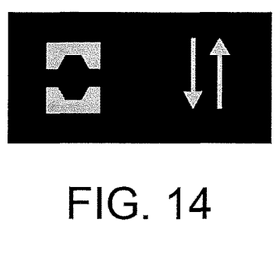
Figure 15:
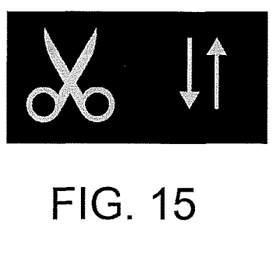
Figure 16:
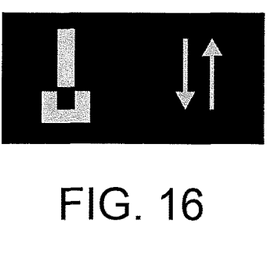
Figure 17:
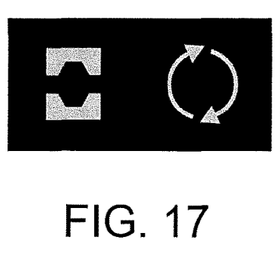
Figure 18:
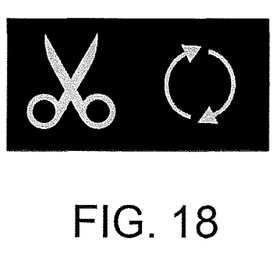

The tool 1 may further comprise a flexible control cable 12 having one pump end 13 removably connected to the housing 3 and connected to the control circuit 28, and an opposite control end 14, to which a hand held remote control 15 is connected for remotely controlling the tool 1. In an embodiment, the flexible control cable 12 may be replaced by a wireless signal connection.

What is claimed is:

1. A hydrodynamic compression or cutting tool comprising:
    an electrical motor, which can be powered by an accumulator or by mains supply, by means of a control circuit,
    a hydraulic pump, which can be actuated by means of the motor so as to increase the pressure of a hydraulic liquid acting on an actuating piston,
    two jaws, movable with respect to each other by means of the actuating piston between an open position and a closed position for carrying out the compression or the cut,
    an actuating button, which acts on a switch of the control circuit to actuate the motor, and which is movable in a first direction and in a second direction,
    a return device, connected to a return valve, which returns the jaws towards the open position by means of a return of the hydraulic fluid from the actuating piston towards the hydraulic pump through a return valve,
    wherein, in a return mode, after completion of the compression or of the cut, the return device opens the return valve and holds the return valve open until the open position of the jaws is reached,
    wherein the opening of the return valve, is delayable to allow verification of the position of the jaws reached before the return of the jaws towards the open position,
    wherein the opening of the return valve by the return device is enabled only if at least one working parameter detected by a sensor has reached a corresponding predetermined or preselectable reference parameter which is indicative of the completion of the compression or cut, such that:
        before completion of the compression or cut, the jaws of the tool can be stopped during their advancement towards the closed position without causing a reopening of the jaws, by releasing the actuation button in said second direction, and
        the return of the jaws by releasing the actuation button in said second direction is enabled only after completion of the compression or cut.

2. A tool according to claim 1, wherein:
    as long as said detected working parameter has not reached said corresponding reference parameter, the compression or cutting operation is not completed and the return device remains disabled and does not open the return valve.

3. A tool according to claim 1, wherein the return device, connected to the actuating button and to the return valve, triggers the opening of the return valve and consequently the movement of the jaws towards the open position, by means of the same actuating button which also controls the actuation of the motor.

4. A tool according to claim 3, wherein:
    when the actuating button is moved to a first position, the return device allows the closing of the return valve and the control circuit actuates and maintains the actuation of the motor, and
    when the actuating button is moved to a second position different from the first position, the control circuit interrupts the actuation of the motor and the return device opens and keeps the return valve open.

5. A tool according to claim 3, wherein the return device comprises an electrical servo motor and a cam and lever mechanism, which engages a shutter of the return valve, wherein a power supply circuit of the servo motor comprises a switch associated with the actuating button and configured to control the servo motor so that:
    when the actuating button is released, the servo motor orients the cam to a position in which the lever opens the return valve and holds it open,
    when the actuating button is actuated, the servo motor orients the cam to a position in which the lever allows the closing of the return valve.

6. A tool according to claim 3, wherein the return device comprises a mechanical-only lever mechanism, connected to the actuating button and with a shutter of the return valve and configured so that:
    when the actuating button is released, the lever mechanism opens the return valve and holds it open,
    when the actuating button is actuated, the lever mechanism allows the closing of the return valve.

7. A tool according to claim 3, wherein the return device comprises a solenoid and a power supply circuit associated with the actuating button and configured to control the solenoid so that:
    when the actuating button is released, the solenoid opens the return valve and holds it open,
    when the actuating button is actuated, the solenoid allows the closing of the return valve.

8. A tool according to claim 2, wherein the return device is connected to the return valve and to the control circuit, and opens the return valve and starts the movement of the jaws towards the open position automatically at the expiry of a preset or preselectable delay time, wherein the delay time is counted from a switch-off of the motor.

9. A tool according to claim 1, wherein the return valve further performs the function of a maximum pressure valve which automatically opens when a maximum calibration pressure is reached in the hydraulic liquid acting on the actuating piston,
wherein the opening of the return valve is not obstructed if the maximum calibration pressure is reached.

10. A tool according to claim 1, comprising a manual return button connected to a manual return device which opens and keeps open the return valve only for the time during which the return button remains pressed and allows the closing of the return valve when the manual return button is released.

11. A tool according to claim 1, comprising a display for selecting and viewing an operating mode between a plurality of operating modes.

12. A tool according to claim 11, wherein said plurality of operating modes comprises one or more of the following:
a manual return mode, wherein the hydraulic liquid return from the actuating piston towards the hydraulic pump is performed by pressing the return button for the entire time needed to reach a desired opening width of the jaws,
a voluntary semi-automatic return mode, wherein the hydraulic liquid return from the actuating piston towards the hydraulic pump is delayed as long as the actuating button is not released and, when the actuating button is released, the return of the hydraulic liquid starts and proceeds automatically until the actuating button is pressed again and if the actuating button is not pressed again in a timely fashion, until the opening position of the jaws is reached,
a working mode, wherein the control circuit turns off the motor automatically when the return valve opens when the maximum calibration pressure is reached,
a working mode, wherein the control circuit determines a completion of the compression or cutting operation in dependency of a comparison of a predetermined or preselected pressure value with a hydraulic liquid pressure detected by means of a pressure sensor connected to the control circuit and, when the compression or cutting operation is completed, the control unit automatically switches off the motor and enables the return means so as to allow a successive actuation,
a compression mode,
a cutting mode,
a punching mode.

13. A tool according to claim 11, wherein said display visualizes one or more of the following:
a value indicative of a maximum force or maximum pressure reached during a working cycle as a function of the hydraulic liquid pressure detected by means of a pressure sensor connected to the control circuit,
a confirmation of the positive or negative outcome of the working cycle as a function of a comparison of a preset or preselected reference value with a corresponding working parameter detected during the working cycle by means of a sensor connected to the control circuit,
an overload warning of overload of one of the components of the hydraulic pump or the tool as a function of a comparison of a preset or preselected reference value with a corresponding working parameter detected during the working cycle by means of a sensor connected to the control circuit,
an instantaneous value of at least one working parameter detected by means of a sensor connected to the control circuit,
a motor overheating warning message when a temperature sensor connected with the control circuit detects a temperature of the motor higher than a preset maximum temperature,
a hydraulic liquid shortage warning when, during the actuation of the motor, a pressure sensor connected to the control circuit detects an absence of hydraulic liquid pressure increase for a predetermined duration of time.

14. A tool according to claim 2, wherein said working parameters and corresponding reference parameters are selected from the group consisting of:
a hydraulic liquid pressure acting on the actuating piston, detected by means of a pressure sensor and corresponding limit pressure,
temperature of the motor or of the hydraulic liquid detected by means of a temperature sensor and corresponding limit temperature,
electrical quantity detected by means of an electrical sensor and corresponding quantity indicative of a limit power drawn by the motor,
jaw position detected by means of a jaw position sensor and corresponding jaw limit position,
position of the actuating piston detected by means of a piston position sensor and corresponding piston limit position,
pressurization time detected by means of a time measurer and corresponding limit time.

15. A tool, according to claim 1, wherein, when the detected working parameter reaches the predetermined or preselected reference parameter, the control circuit automatically switches off the motor and automatically enables the return mode, such that, after the return mode has been enabled, releasing the actuating button in said second direction opens the return valve and holds the return valve open.

16. A tool, according to claim 1, wherein the actuating button, as long as it remains actuated by the operator in a first direction, prevents and delays the function of the return device.

17. A tool, according to claim 1, wherein actuating the actuating button in said first direction allows the closing of the return valve through a spring which permanently pushes a shutter of the return valve in a closed position,
wherein, after the return mode has been enabled, releasing the actuating button opens the return valve and holds the return valve open.

18. A tool, according to claim 1, wherein, after completion of the compression or cut, depressurization and return of the hydraulic fluid through the return valve, and return of the jaws toward their open position, are delayed until the manual pressure on the actuation button is released,
wherein, only when the manual actuation button is released, the hydraulic fluid starts to return through the return valve, which continues automatically until the actuation button is pressed again, and, in the absence of a timely actuation of the actuation button, until the open position of the jaws is reached.

* * * * *